United States Patent

[11] 3,620,223

| [72] | Inventors | Homer D. Witzel<br>Moline, Ill.;<br>Pieter F. Olieman, Valkenswaard,<br>Netherlands |
|---|---|---|
| [21] | Appl. No. | 34,190 |
| [22] | Filed | May 4, 1970 |
| [45] | Patented | Nov. 16, 1971 |
| [73] | Assignee | Deere & Company<br>Moline, Ill. |
| [32] | Priority | Jan. 14, 1970 |
| [33] | | Germany |
| [31] | | P 20 01 386.9 |

[54] CROP AGITATOR FOR THE SEPARATING MECHANISM OF AGRICULTURAL COMBINES AND THE LIKE
18 Claims, 8 Drawing Figs.

| [52] | U.S. Cl. | 130/22 A |
|---|---|---|
| [51] | Int. Cl. | A01f 12/10 |

[50] Field of Search... 130/22 R, 22 A, 26, 27 E, 21, 1

[56] References Cited
UNITED STATES PATENTS

| 675,418 | 6/1901 | Shavland | 130/22 A |
|---|---|---|---|
| 2,617,518 | 11/1952 | Anderson | 130/22 A |
| 447,433 | 3/1891 | Landis | 130/26 |
| 1,158,944 | 11/1915 | Lucas | 130/22 R |

*Primary Examiner*—Antonio F. Guida
*Attorneys*—H. Vincent Harsha, Harold M. Knoth, William A. Murray, John M. Nolan and Raymond L. Hollister

ABSTRACT: The separating mechanism of a combine is improved by the provision of a combination rotary and axially oscillating agitator acting on the crop passing lengthwise of the straw walkers so as to facilitate the separation of grain from straw.

PATENTED NOV 16 1971

INVENTORS
HOMER D. WITZEL
PIETER F. OLIEMAN

FIG. 6
FIG. 7
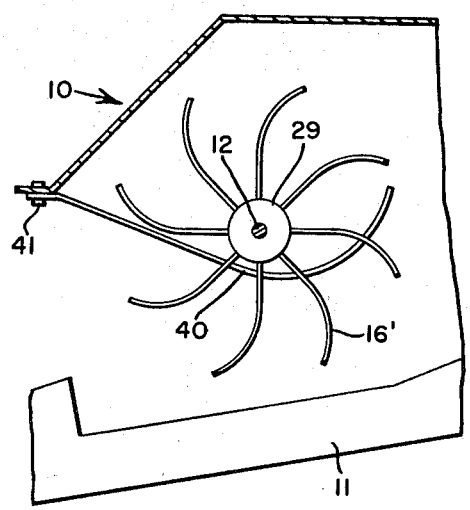
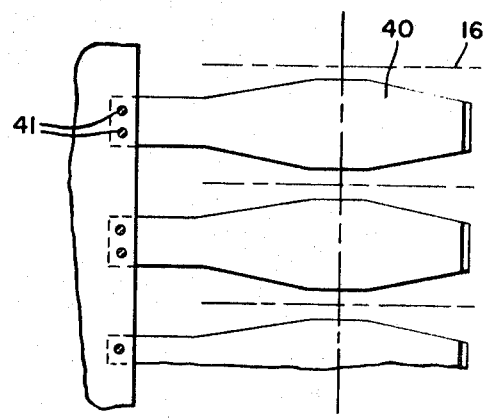
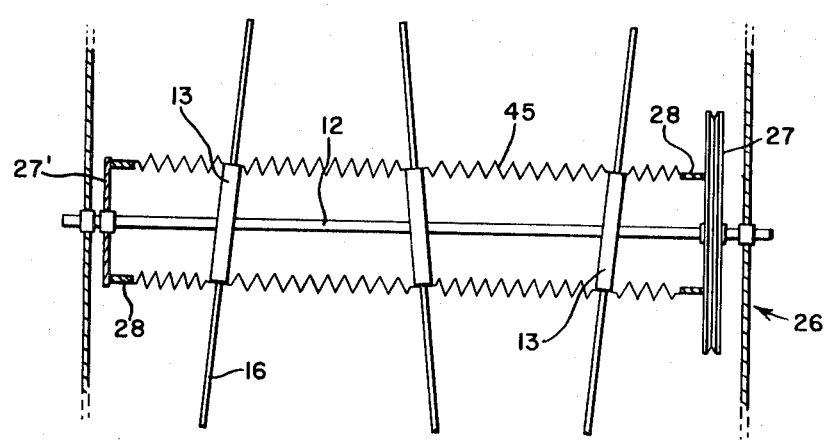
FIG. 8

CROP AGITATOR FOR THE SEPARATING MECHANISM OF AGRICULTURAL COMBINES AND THE LIKE

BACKGROUND OF THE INVENTION

The conventional agricultural combine includes a mobile frame which carries a forward header for harvesting grain from the field and conveyor means for delivering the crop to a threshing mechanism comprising a cylinder and cooperative concave which threshes a certain portion of the grain from the straw but which leaves a substantial portion of the crop to be further handled by a separating and cleaning system. The threshing mechanism discharges the threshed crop rearwardly to the front or inlet end of elongated, normally fore-and-aft straw walkers which are oscillated to move from fore-and-aft as well as vertically and the grain theoretically sifts downwardly through the walkers, along with a certain amount of chaff, to the cleaning sieves below the walkers, the straw being discharged over the rear ends of the walkers and the chaff being blown out of the cleaning system by suitable blowers.

The above combination represents the basic combine and, subject to minor variations in design, provisions for adjustment, etc., the capacity and efficiency of similar combines do not vary widely. Both capacity and efficiency are capable of being increased simply by increasing the size of the machine, or at least increasing the size of the separating and cleaning system, but this leads only to to impracticable sizes that are prohibitive from the cost standpoint as well as from limitations imposed on sizes from the standpoint of transporting such machines over existing roads, railways, etc. Consequently, increased efficiency must be sought in either a completely different design or improvements in the presently commercially acceptable design. The present invention takes the latter approach.

SUMMARY OF THE INVENTION

One characteristic of the crops delivered by the threshing mechanism to the straw walkers is that the crops tend to move over the walkers, normally from front to rear, and these crops become a mat of tangled straw through which the grain finds difficulty in descending to the cleaning system below, with the result that a significant amount of grain is carried over the walkers and discharged with the straw, constituting grain loss, which is an accepted way of measuring efficiency. Thus, the efficiency can be increased by decreasing grain loss; i.e., causing less grain to be discharged with the straw, instead leading it to the cleaning system for eventual collection as clean grain. According to the present invention, the efficiency of a conventional combine is materially increased by agitating the straw crosswise of its normal path of travel over the walkers, thus "fluffing" or breaking up the mat so that more grain drops through the walkers. The agitation system further provides a rotary motion consonant with normal movement of the crops over the walkers so as to avoid compacting the mat. The mechanism employed comprises a plurality of crop-engaging fingers or tines coaxially mounted on a rotary shaft by wobble elements so that as the shaft is rotated, the tines rotate in planes inclined to the main axis of the shaft, and thus, the terminal ends of the fingers oscillate rapidly crosswise of the lengthwise moving crop mat. At the same time, the fingers are caused to rotate so that their lower extremities, relatively deeply penetrating the crop mat, move in a direction along the path but comparably slowly, whereby crosswise oscillation is substantially more rapid than "pathwise" rotation.

A further feature is that the combination rotary and oscillating mechanism includes a cage or drum for enclosing or substantially enclosing the wobble members and providing openings or slots through which the fingers project radially. In addition, means is provided for preventing crops from wrapping or winding on the mechanism.

BRIEF DESCRIPTION OF THE DRAWINGS

FIG. 6 is a fragmentary view similar to the left-hand part of FIG. 1, but showing a modified form of the invention.

FIG. 7 is a schematic top plan view of FIG. 6.

FIG. 8 illustrates schematically another form of the invention.

DESCRIPTION OF THE PREFERRED EMBODIMENTS

Figure 1:
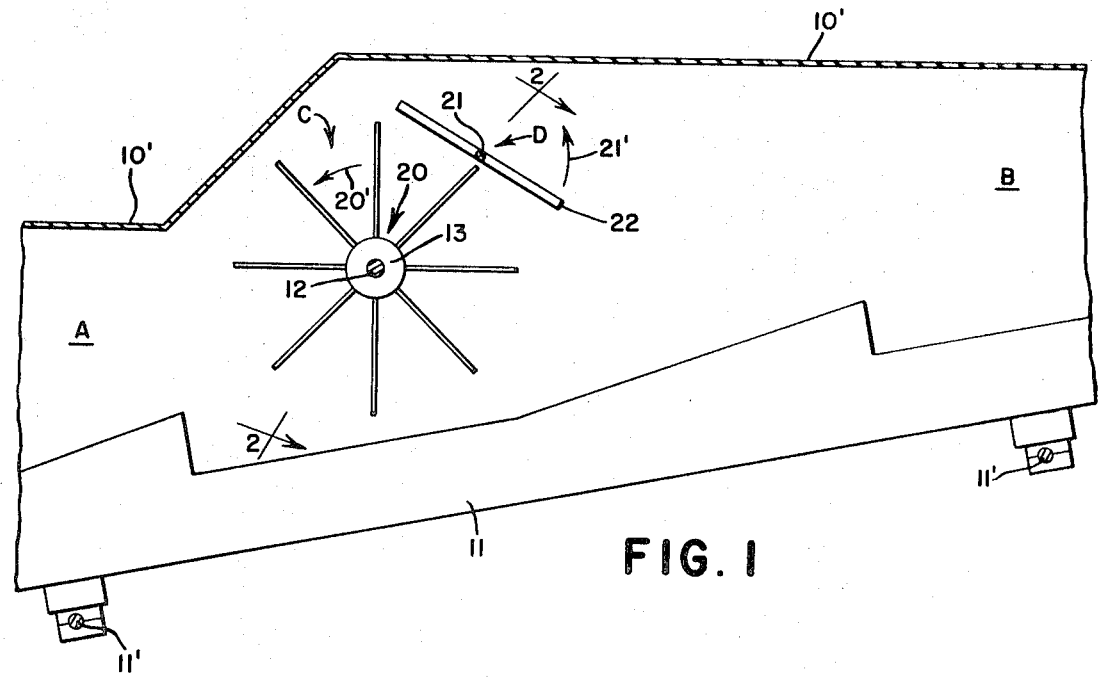
FIG. 1 is a longitudinal section through the separating mechanism, schematic in many respects.

Because the general construction of a conventional combine of the threshing-separating-cleaning type is well known, many of the components here are illustrated and described rather briefly. The basic support structure of body of the separator is designated by the numeral 10. Since conventional construction arranges this body fore-and-aft, reference will be to the structure as having front and rear ends, but this is not to be taken as excluding other arrangements. Typical straw walker means 11 is disposed lengthwise within the body 10 below the top 10' of the body, and the space between the walkers and the body top defines generally a crop-receiving space having a front or inlet end A and a rear or outlet end B. Threshing mechanism, not shown, conventionally including a rotating cylinder and cooperating concave delivers the crop rearwardly to the inlet A, and the walkers are typically oscillated back and forth as well as vertically, as by the usual crank means 11'. The stepped construction of the walkers, along with the usual "fishbacks" (not shown in detail), causes the crops to move in a lengthwise path from front to rear or from A to B (left to right as seen in FIG. 1). Conventionally, the grain sifted out through the action of the walkers drops through to cleaning mechanism (not shown) and the theoretically grain-free straw will be discharged over the rear end of the walkers or through the outlet B.

As previously described, the crops tend to mat and tangle on the walkers and thus prevent efficient separation of the grain from the straw, resulting in carrying out a significant portion of the grain with the straw as grain loss. The present invention provides a combination rotary and oscillating device C which "fluffs" the crop mat so that the overall efficiency of the walkers is materially heightened.

Figure 4:
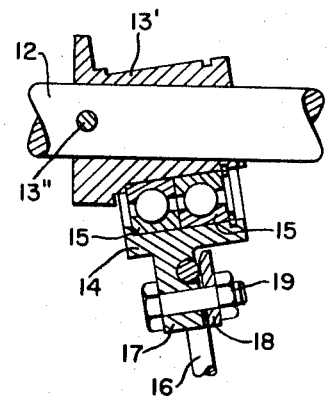
FIG. 4 is an enlarged section through a portion of one of the wobble elements.
Figure 5:
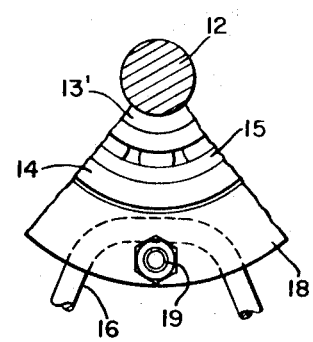
FIG. 5 is a fragmentary end view of the structure shown in FIG. 4.

Device C comprises a rotary shaft means 12 suitably journaled adjacent to its opposite ends in the separator body 10 and extending crosswise of and above the walkers 11 intermediate the inlet and outlet ends A and B. The shaft carries wobble elements 13—here a pair—, each including a hub 13' formed as a cylinder having its axis inclined to that of the shaft 12. Each hub is fixed to the shaft as by a pin 13" (FIG. 4) so as to turn with the shaft, and each hub concentrically journals a cup 14 by means of antifriction bearings 15. Each cup has fixed thereto a plurality of radial crop-engaging fingers or tines 16, the method of affixation being such as that shown in FIG. 4; e.g., each cup has a outer flange 17 between which and a ring 18 the inner portions of the fingers are removably secured as by bolts 19. Each pair of fingers is preferably of "-hairpin" type and the bight thereof is clamped to the cup flange. See FIG. 5.

Figure 2:
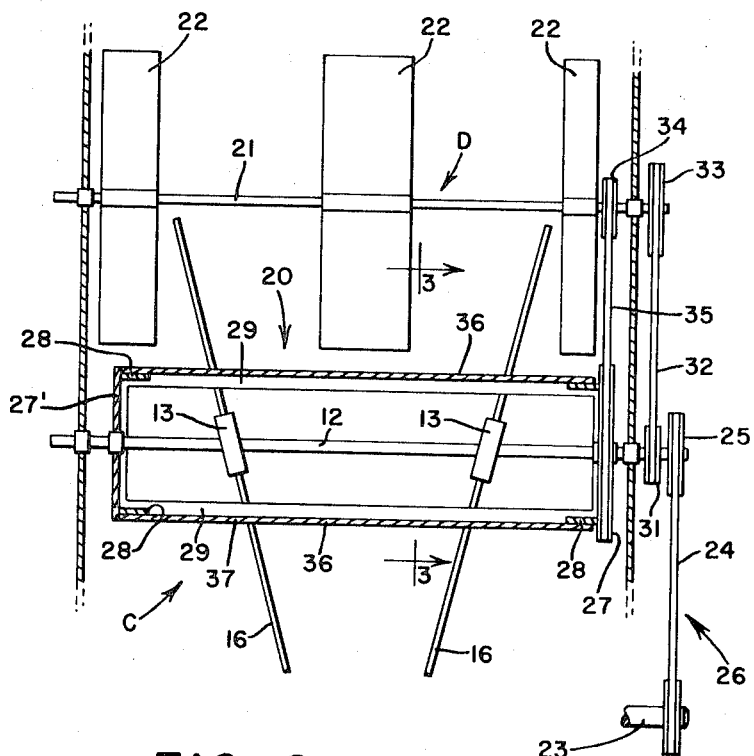
FIG. 2 is an enlarged view, partly in section as seen along the line 2—2 in FIG. 1.

Because the axis of each hub is inclined to the main axis of the shaft 12, the fingers or tines 16 travel in planes inclined to a radial plane normal to the shaft axis (FIG. 2). Where, as in the present case, two wobble elements 13 are used, the planes of rotation of the fingers will incline at opposite equal angles to the main axis of the shaft; i.e., the wobble elements are staggered 180° in a circumferential direction, 180° being a function of dividing 360° by the number of wobble elements (here two). If more wobble elements are used, the same division occurs; i.e., 360° divided by the number of wobble elements; e.g., three elements would be staggered by 120°, etc.

The disposition of the shaft 12 is relatively high above the walkers, taking into consideration, of course, the available space between the walkers and the body top 10'. A basic consideration is that the fingers 16 are quite long so that the tips thereof travel relatively closely to the walkers so as to penetrate quite deeply the mat of walker-carried crops. This assures that the mat is agitated from top to bottom so that grain is released to sift through the perforated bottoms of the walkers.

It is also significant that the crosswise stroke of the wobble element-mounted fingers is such that at least the outer portions of the entire width of the walkers is accommodated. This is a function of the angle of the wobble elements to the shaft 12. See FIG. 2. Further, the division of the total circumference (360°) by the number of wobble elements 13 (here two) equalizes or counterbalances the mass of the lateral or crosswise motion.

It is a characteristic of the device C that, as the shaft 12 is rotated to oscillate the fingers 16, the fingers are driven by means such as a drum or cage 20 so that the fingers also rotate in such manner that the terminal or lower end portions thereof rotate in a manner and at a speed consonant with the front-to-rear travel of the crop mat over the walkers 11. See arrow 20', FIG. 1. As one means for preventing wrapping or winding of crops on the means 20, the mechanism may include a stripping device D, here comprising a shaft 21 journaled in the body 10 on an axis parallel to and spaced above the level of the shaft 12 and to the rear thereof (FIG. 1). The shaft 21 has fixed thereto a plurality of beaters or paddles 22 axially interspaced with the fingers 16 (FIG. 2) so that the paddles operate between the oscillating fingers. The stripper means D rotates in the same direction (arrow 21') as the device C.

Available on any combine are several shafts, driven from the combine engine, for example, that may be used as a power source. One such shaft may be the beater shaft, indicated here at 23. This shaft is drivingly connected at 24 to a sheave 25, for example, fixed to the shaft 12 and designed to rotate the shaft 12 at a predetermined speed consistent with the desired oscillation cycles of the fingers 16. In a construction in which the rotary stripping device D of FIGS. 1 and 2 is used, the drive may be extended to the shaft 21 and back to drive the means 20 for rotating the fingers. In this example, the shaft 12 has fixed thereto, outside the body 10, a sheave 31 that is belted at 32 to a sheave 33 keyed to the stripper shaft 21, and the latter fixedly carries a sheave 34 that is connected by a belt 35 to a sheave 27 journaled on the shaft 12. The whole establishes a drive means 26 for turning the shaft 12 and means 20 at different speeds, the ratio being such that the shaft 12 rotates at a speed materially higher than the means 20; e.g., the ratio is such that the oscillation cycles of the fingers 16 are in the order of 15 to 20 per revolution of the means 20. The sheave and belt means may, of course, be replaced by any equivalent means.

To complete the means 20, the sheave 27 is paired with a comparable circular plate 27' journaled at the other end of the shaft, and the sheave and plate are interconnected, in simplest form by a pair of diametrically opposed crossbars 29 past which certain of the fingers project loosely radially. These bars, preferably of hard wood or other equivalent material, provide adequate bearing surfaces to allow rapid oscillation of the fingers while the means 20 causes the fingers 16 to rotate. The members 27 and 27' are preferably flanged at 28 to serve as means for connecting the bars 29.

Figure 3:
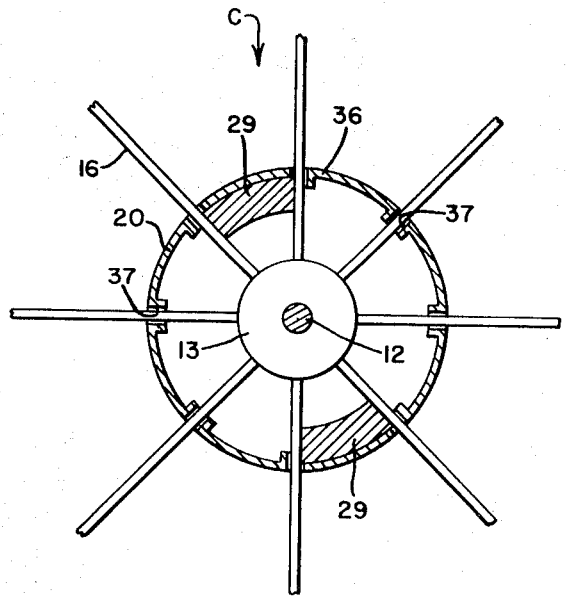
FIG 3 is a section along the line 3—3 in FIG. 2.

To the extent described, the members 27 and 27' and the bars 29 afford a cage, but in a preferred construction, the cage may be augmented by a drum structure 36 which substantially concentrically encloses the wobble elements 13 to shield same from chaff, etc. As seen in FIG. 3, the drum has a plurality of slots 37 through which the fingers 16 loosely project, the slots being formed by inturned portions of the drum, here of sheet metal or the like.

In the modified form of the invention shown in FIGS. 6 and 7, two characteristics have been changed; although, either is interchangeable with what is been described. One modification is that the terminal ends of the fingers 16 are curved at 16' in the direction opposite to the direction of rotation of the fingers by the means 20. Another change is that stationary stripper means is provided, here a plurality of elongated strips 40 attached at 41 to the support or body 10. As seen in FIG. 7, the strips 40 are configured to accommodate oscillation of the fingers 16.

FIG. 8 shows a further modification that may be used in conjunction with the structure described above, it being understood in this regard that the rotary and oscillating device 20 could perform without the stripper. In this case, the end members 27 and 27', instead of being interconnected by the drum or cage 36, are cross-connected by a structure 45 that is capable of axial expansion and contraction, such as a flexible bellows operative in accordion fashion to accommodate oscillation of the fingers 16, the bellows being also effective to transmit torque among the members 27 and 27' and the wobble elements 13.

Basically, there are many variables to consider, depending upon the length and width of the walkers, the amount and kind of crops delivered to the walkers, the available space for the means 20, etc. In one type of separating mechanism in which the walkers have a width of 780 mm. and a length of 3,630 mm., excellent results have been achieved by a system in which the shaft 12 is located high enough above the walkers 11 so that the cage or drum 36 clears the walkers by approximately 300 to 500 mm., which means that the fingers 16 are long enough to clear the walker surface by 40 to 80 mm., whereby the fingers may adequately penetrate the crop mat. The lateral oscillation of the fingers should be in the order of 120 to 200 mm. with a tangential speed of about 60 to 90 cm./second. These will, of course, change with walker area, but the above are given as examples to signify that the dimensional and speed aspects are factors to be regarded in comparing the subject invention with the prior art.

We claim:

1. In an agricultural combine having a crop-separating system including support structure, a power source and elongated strawwalker means over which crops are moved in a lengthwise path from a crop inlet to a straw outlet for effecting downward separation of grain from straw, the improvement residing in means for agitating the crops crosswise of said path to facilitate grain separation, said agitating means comprising rotary shaft means carried by the support structure above and crosswise of the walker means, a plurality of wobble elements spaced apart axially of and journaled on the shaft means for rotation respectively in planes inclined to the main axis of the shaft means, each element having fixed thereto a plurality of fingers projecting radially therefrom for engaging the crops on the walkers, and drive mechanism connected to the power source and to the agitating means and including a first drive means for rotating the shaft means to cause the wobble elements to oscillate the fingers transversely of the crop path and second drive means for simultaneously rotating the fingers so that the lower ends thereof move in the direction of the aforesaid crop path.

2. The invention defined in claim 1, in which the two drive means are so constructed and arranged as to oscillate the fingers relatively rapidly as compared to the speed of rotation of the fingers.

3. The invention defined in claim 2, in which the speed of rotation of the shaft means is in the order of 10 to 30 times the speed of rotation of the fingers.

4. The invention defined in claim 2, in which the relative speeds of rotation of the shaft means and fingers is such that the fingers oscillate in the order of 15 to 20 cycles per revolution of the fingers.

5. The invention defined in claim 1, in which the second drive means includes a connection to the wobble elements, said connection including a tubular structure concentric with the shaft means and constructed of axially expansible and contractable material having openings therein through which the fingers project radially.

6. The invention defined in claim 5 in which said tubular structure is of accordionlike nature.

7. The invention defined in claim 1, in which the drive means are so constructed and arranged that the tip speed of the fingers lengthwise of the crop path is approximately the same as the crop speed along the path as induced by the walker means and the oscillation of the fingers is several times greater than said tip speed.

8. The invention defined in claim 1, in which the second drive means includes a cage structure coaxial with the rotatable relative to the shaft means and including portions engaging at least some of the fingers to rotate said fingers.

9. The invention defined in claim 1, in which the second drive means includes a drum structure coaxial with and rotatable relative to the shaft means and including slots through which the fingers project, portions of the drum bordering certain of said slots engaging at least some of the fingers to rotate said fingers.

10. The invention defined in claim 1, including means external to the agitating means and cooperative with and for stripping crops from the fingers.

11. The invention defined in claim 9 in which the stripping means includes a second shaft means journaled in the support structure in parallelism with and spaced toward the outlet from the first-mentioned shaft means and beater means on and rotatable with the second shaft means in axially interspaced relation with the fingers.

12. The invention defined in claim 10, in which the stripping means includes fixed members carried by the support structure above the crop path and, in axially interspaced relation with the fingers.

13. The invention defined in claim 10, in which the stripping means includes a second shaft means journaled in the support structure in parallelism with and spaced toward the outlet from the first-mentioned shaft means and beater means on and rotatable with the second shaft means in axially interspaced relation with the fingers and the drive means includes portions driving the stripping means.

14. The invention defined in claim 13, in which the drive mechanism includes portions driving the stripping means at one speed, the fingers at another speed and the first mentioned shaft means at still another speed.

15. The invention defined in claim 1, in which the tip end of each finger is curved opposite to the direction of rotation thereof.

16. The invention defined in claim 1, in which the length of each finger is such that it is capable of projecting substantially to the bottom of the layer of crops on the walker means and the shaft means is above the top of such layer.

17. The invention defined in claim 1, in which the combined stroke of oscillation of the fingers is substantially equal to the width of the walker means.

18. The invention defined in claim 1, in which the wobble elements are staggered and inclined to the main axis of the shaft means in circumferential direction by 360° divided by the number of wobble elements.

* * * * *

UNITED STATES PATENT OFFICE
CERTIFICATE OF CORRECTION

Patent No. 3,620,223          Dated 16 November 1971

Inventor(s) Homer D. Witzel and Pieter F. Olieman

It is certified that error appears in the above-identified patent and that said Letters Patent are hereby corrected as shown below:

Column 5, line 10, change "the" to -- and --; line 22, change "9" to -- 10 --.

Column 6, line 1, cancel the comma.

Signed and sealed this 23rd day of May 1972.

(SEAL)
Attest:

EDWARD M. FLETCHER, JR.          ROBERT GOTTSCHALK
Attesting Officer          Commissioner of Patents